UNITED STATES PATENT OFFICE.

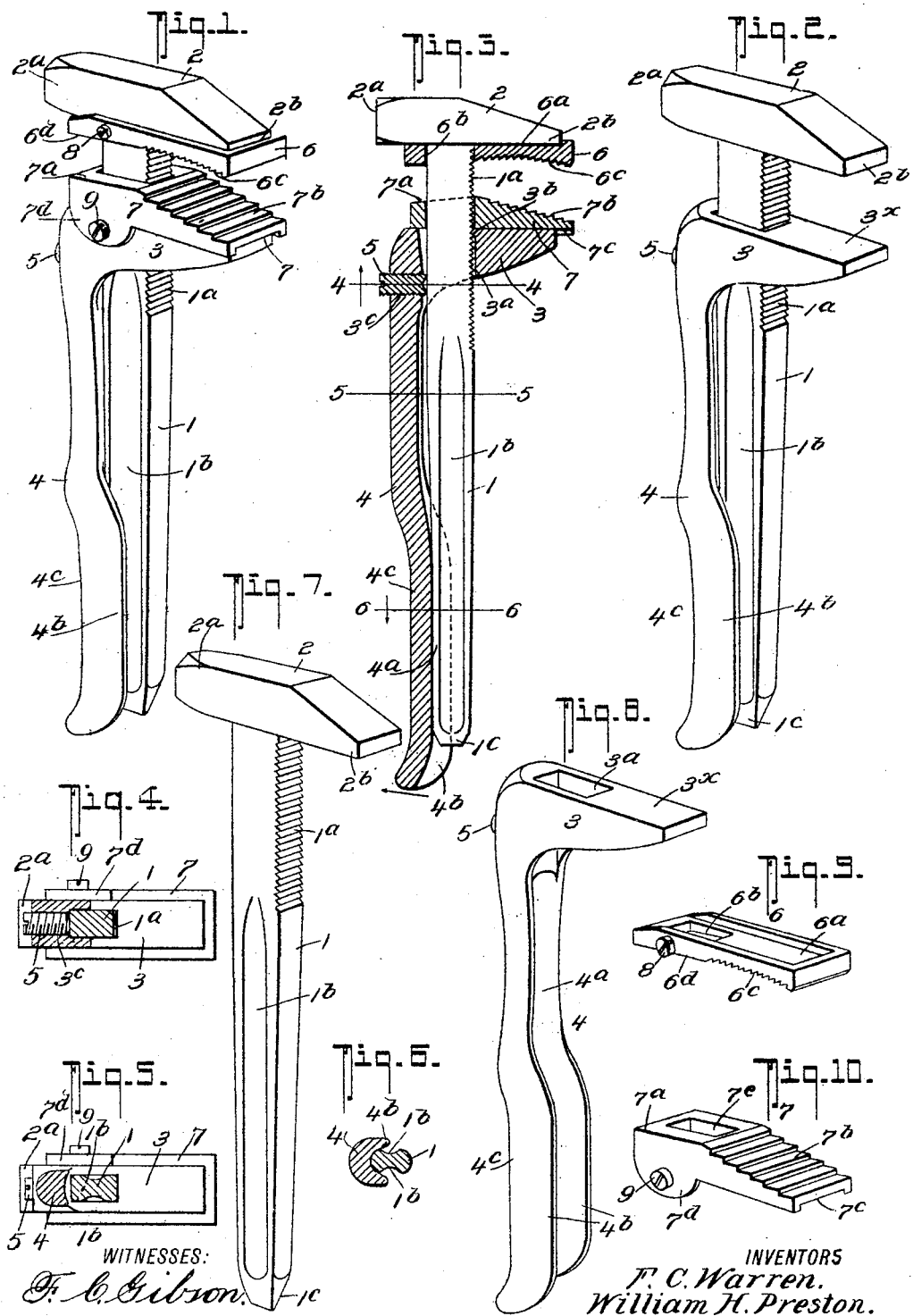

FREDERICK C. WARREN AND WILLIAM H. PRESTON, OF VALLEY JUNCTION, WISCONSIN.

WRENCH.

No. 805,506.      Specification of Letters Patent.      Patented Nov. 28, 1905.

Application filed September 5, 1905. Serial No. 276,949.

*To all whom it may concern:*

Be it known that we, FREDERICK C. WARREN and WILLIAM H. PRESTON, residing at Valley Junction, in the county of Monroe and State of Wisconsin, have invented certain new and useful Improvements in Wrenches, of which the following is a specification.

This invention relates to certain new and useful improvements in wrenches, and it particularly seeks to provide a wrench capable of a plurality of uses and of a simple construction.

In its generic nature, the invention comprises a longitudinal shank member having a fixed jaw at one end formed, a second shank or handle member having an integrally-formed jaw at one end apertured to receive the first shank member and having the lower portion of the shank grooved to receive the first shank member and designed to form a convenient hand-engaging portion. The movable shank-handle and jaw has an adjustable fulcrum and a fixed-tooth fulcrum for engaging with a rack portion on the first-mentioned shank.

The invention also comprises a pair of separate supplemental jaws adapted to be fitted on the first-mentioned shank and coöperate with the fixed jaw thereof and the movable jaw and having means for firmly attaching them to their respective parts, said supplemental jaws having their engaging faces serrated to be used when the invention is to be used as a pipe-wrench.

In its detailed nature the invention comprises certain novel construction, combination, and arrangement of parts, all of which will be first described in detail and then pointed out in the appended claims; and the invention primarily has for its object to provide a tool of the character above stated, of a very simple and effective construction, in which the parts are so coöperatively arranged and designed as to afford the greatest strength with the least amount of material.

Referring now to the accompanying drawings, in which like numerals of reference indicate like parts in all the figures, Figure 1 is a perspective view of the invention complete with the supplemental jaws attached. Fig. 2 is a similar view with the supplemental jaws removed. Fig. 3 is a vertical longitudinal section of the parts shown in Fig. 1. Fig. 4 is a cross-section on the line 4 4 of Fig. 3 looking in the direction of the arrow. Fig. 5 is a similar view on the line 5 5 of Fig. 3. Fig. 6 is a cross-section on the line 6 6 of Fig. 3. Fig. 7 is a detail perspective view of the fixed jaw and shank. Fig. 8 is a similar view of the movable jaw and handle or shank. Fig. 9 is a detail perspective view of the upper supplemental jaw. Fig. 10 is a similar view of the lower supplemental jaw.

In the drawings, 1 designates the main shank member to which the fixed jaw is 2 attached either by forming the same integrally or by securing the same thereto, and the fixed jaw 2 has a hammer-head $2^a$ and a nut-engaging face $2^b$, as shown. The front face of the shank 1 has a rack portion $1^a$ throughout a portion of its length, as shown, and the shank is furthermore provided with grooves $1^b$ $1^b$ to reduce the weight thereof, and the said shank 1 terminates in a screw-driver $1^c$ at its lower or free end, as shown.

The sliding jaw 3 is integrally formed with a handle portion 4 and has a rectangular slotway $3^a$ to permit passage of the shank 1, which slotway is provided on its inner face with a rack-engaging tooth $3^b$, as shown. At the rear the jaw 3 has a threaded aperture $3^c$ to receive the adjustable fulcrum 5. The handle member 4 is concaved on its inner face, as at $4^a$, and provided at its lower end with an overlapping portion $4^b$ for overlapping the shank 1, and the said handle member 4 is also cut away, as at $4^c$, to form a convenient hand engaging or gripping portion for the tool.

When our invention is to be used as an ordinary wrench, it comprises only the parts just before mentioned, and by simply throwing the handle member out in the direction of the arrow in Fig. 3 the same can be disengaged from the rack and adjusted along the shank 1, the jaw 3 having a nut-engaging face $3^\times$ to correspond with the nut-engaging face $2^b$ of the fixed jaw 2; but when the invention is to be used as a pipe-wrench the supplemental jaws 6 and 7 are placed into position, as shown in Figs. 1 and 3.

The jaw 6, as shown in detail in Fig. 9, comprise a rectangular member having its upper face provided with a groove $6^a$ to receive the lower face of the jaw 2 and provided with a slot $6^b$ to permit passage of the shank 1, to which it is secured by a set-screw or winged nut 8, as shown. The under face of the supplemental jaw 6 is provided through about one-half of its length with a pipe-engaging serrating face $6^c$, which merges with a second face $6^d$ in a plane at an angle to the upper face $6^a$ of the jaw to coöperate with the upper face $7^a$ of the lower supplemental jaw 7, which lies in a plane parallel to the plane of the face $6^d$, and the lower supplemental jaw 7 has a serrated pipe-engaging face $7^b$, extending in a plane at an angle to that containing the face $7^a$ and at an angle to the lower face $7^c$ of the jaw 7. The lower face $7^c$ of the jaw 7 is countersunk to fit over the jaw 3 and is furthermore provided with a wing $7^d$, through which a set-screw or wing-bolt 9 passes to secure the supplemental jaw 7 to the jaw 3, as shown. The jaw 7 also has an aperture $7^e$ to permit passage of the shank 1.

From the foregoing it will be seen the invention provides a very simple and effective construction of combination-tool combining nut and pipe-wrench, a hammer, and a screw-driver all in one, and the parts are so arranged and designed as to be constructed with the minimum amount of material and the maximum amount of strength. The particular construction of the handle 4, in combination with the shank 1, provides a convenient hand-gripping portion by means of which the tool can be manipulated.

Having thus described our invention, what we claim, and desire to secure by Letters Patent, is—

1. A tool of the class described, comprising a fixed jaw and a shank depending therefrom, a handle member, a movable jaw integrally formed with said handle member and apertured to receive said shank of the fixed jaw, said handle member having portions for overlapping the shank of the fixed jaw, and a cut-away portion to form a hand-grip, said fixed-jaw shank having a serrated face and said movable jaw having a fulcrum for engaging said serrated face and an adjusting-fulcrum for engaging the opposite face of the shank, substantially as shown and described.

2. A tool of the class described, comprising a fixed jaw and a shank depending therefrom, a handle member, a movable jaw integrally formed with said handle member and apertured to receive said shank in the fixed jaw, said handle member having portions for overlapping the shank of the fixed jaw, and a cut-away portion to form a hand-grip, said fixed-jaw shank having a serrated face, said movable jaw having a fulcrum for engaging said serrated face and an adjustable fulcrum for engaging the opposite face of the shank, and supplemental jaw members apertured to permit passage of said shank, one of said jaw members being secured adjacent the fixed jaw and the other supplemental jaw member being secured to the movable jaw, said supplemental jaw members having their adjacent faces serrated substantially as shown and described.

3. A tool of the class described, comprising a shank having a fixed head at one end having a nut-engaging face, a second jaw and a handle member integrally formed with each other, said second jaw having an aperture to permit passage of said shank, said shank having a rack-face and said second jaw having a tooth for coöperating with the rack-face of the shank, said second jaw having an adjustable fulcrum for coöperating with the opposite face of the shank and said handle member having its shank-adjacent face convexed and provided with portions for overlapping the shank substantially as shown and described.

4. A tool of the class described, comprising a shank having a fixed head at one end, having a nut-engaging face, a second jaw and a handle member integrally formed with each other, said second jaw having an aperture to permit passage of said shank, said shank having a rack-face and said second jaw having a tooth for coöperating with the rack-face of the shank, said second jaw having an adjustable fulcrum for coöperating with the opposite face of the shank, said handle member having its shank-adjacent face convexed and provided with portions for overlapping the shank, and said handle member having a cut-away portion $4^c$ to form a hand-grip substantially as shown and described.

5. A tool of the class described, comprising a shank having a fixed head at one end, having a nut-engaging face, a second jaw and a handle member integrally formed with each other, said second jaw having an aperture to permit passage of said shank, said shank having a rack-face and said second jaw having a tooth for coöperating with the rack-face of the shank, said second jaw having an adjustable fulcrum for coöperating with the opposite face of the shank said handle member having its shank-adjacent face convexed and provided with portions for overlapping the shank, and said handle member having a cut-away portion $4^c$ to form a hand-grip, a supplemental jaw having its upper face grooved and provided with an aperture to permit passage of the shank, said supplemental jaw adapted to receive the fixed jaw in its groove, means for securing said supplemental jaw to the shank, said supplemental jaw having its under face provided with a serrated portion, and a second supplemental jaw having an aperture to permit passage of the shank and a serrated portion on the face adjacent the first supplemental jaw, said second supplemental jaw having its lower face countersunk to receive the handle-jaw and having a wing provided with an aperture, means coöperating with said wing-aperture for securing said second supplemental jaw to the handle-jaw substantially as shown and described.

6. A tool of the class described comprising a fixed jaw and a shank depending therefrom, a handle member, a movable jaw integrally formed with said handle member and apertured to receive the shank in the fixed jaw, said handle member having portions for overlapping the shank of the fixed jaw, and a cut-away portion to form a hand-grip, said fixed-jaw shank having a serrated face, said movable jaw having a fulcrum for engaging said serrated face, an adjustable fulcrum for engaging the opposite face of the shank, and supplemental jaw members apertured to permit passage of said shank, one of said jaw members being held adjacent the fixed jaw, and the other supplemental jaw member being held adjacent the movable jaw, substantially as shown and described.

FREDERICK C. WARREN.
WILLIAM H. PRESTON.

Witnesses:
W. H. PRICE,
MADGE GRISWOLD.